United States Patent [19]

Igarashi et al.

[11] Patent Number: 5,084,314
[45] Date of Patent: Jan. 28, 1992

[54] REFRIGERANT TRANSPORTING HOSE HAVING PHENOLIC RESIN LAYER

[75] Inventors: Ichiro Igarashi, Komaki; Hiroaki Ito, Kasugai, both of Japan

[73] Assignee: Tokai Rubber Industries, Ltd., Aichi, Japan

[21] Appl. No.: 529,549

[22] Filed: May 29, 1990

[30] Foreign Application Priority Data

May 29, 1989 [JP] Japan .................. 1-135622

[51] Int. Cl.$^5$ ............................. F16L 11/04
[52] U.S. Cl. ............... 428/36.2; 138/DIG. 1;
138/DIG. 7; 138/137; 138/125; 138/141;
138/135; 428/36.3; 428/36.7; 428/36.91
[58] Field of Search .......... 138/137, 125, 126, 141,
138/135, DIG. 1, DIG. 7; 428/35.7, 36.2, 36.3,
36.7, 36.8, 36.9, 36.91

[56] References Cited

U.S. PATENT DOCUMENTS

| | | | |
|---|---|---|---|
| 4,308,896 | 1/1982 | Davis | 138/126 |
| 4,905,734 | 3/1990 | Ito | 428/36.91 |

Primary Examiner—Patrick J. Ryan
Assistant Examiner—J. Weddington
Attorney, Agent, or Firm—Oliff & Berridge

[57] ABSTRACT

A refrigerant transporting hose including a polyamide resin innermost layer, at least one intermediate rubber layer positioned radially outwardly of the innermost layer, a reinforcing fiber layer positioned radially outwardly of the intermediate rubber layer or layers, an outer tube which is positioned radially outwardly of the fiber layer and has at least one layer including an outermost layer, and at least one phenolic resin layer formed of a phenolic resin and having a total thickness within a range of 5-100 μm. Each phenolic resin layer is provided at a corresponding one of interfaces between adjacent layers which are selected from the innermost layer, the intermediate layer or layers, the fiber layer and the layer or layers of the outer tube.

11 Claims, 1 Drawing Sheet

U.S. Patent
Jan. 28, 1992
5,084,314
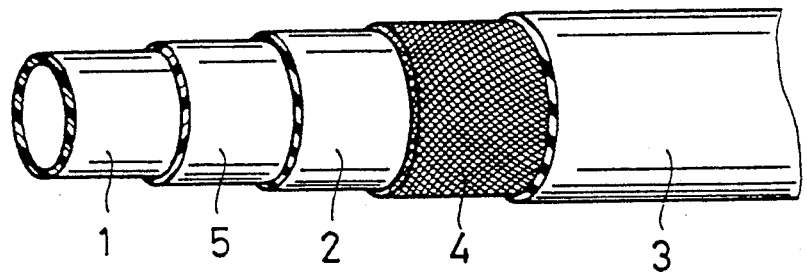

REFRIGERANT TRANSPORTING HOSE HAVING PHENOLIC RESIN LAYER

BACKGROUND OF THE INVENTION

1. Field of the Invention

The present invention relates in general to refrigerant transporting hoses, and more particularly to such hoses suitably used as pipings for coolers, air conditioners and the likes provided on automotive vehicles.

2. Discussion of the Prior Art

There is known a hose for transporting a refrigerant such as flon (fluorohydrocarbon and chlorofluorohydrocarbon). The hose has an integrally formed three-layer laminar construction consisting of an inner tube, an outer tube located radially outwardly of the inner tube, and a reinforcing fiber layer interposed between the inner and outer tubes. Generally, the inner tube is formed of acrylonitrile-butadiene rubber (NBR) or chlorosulphonated polyethylene (CSM), while the reinforcing fiber layer has a mesh structure formed by braided organic yarn such as polyester fiber, rayon fiber, or nylon fiber. On the other hand, the outer tube is formed of ethylene propylene diene rubber (EPDM) or chloroprene rubber (CR).

The known multi-layered hose, which is formed of rubber materials except for the reinforcing layer, has a high degree of flexibility. Because of this property of the rubber materials, the hose can be handled with ease, when used as rubber pipings, for example. In addition, the hose is free from deterioration due to harmful metallic substances such as metallic ions and/or metal chlorides originating from metallic pipings used in a refrigerating or cooling circuit.

However, rubber materials generally tend to have comparatively high gas permeability, that is, low resistance to gas permeation therethrough. Accordingly, the conventional rubber hose whose major component consists of rubber materials suffers from a problem that the refrigerant (e.g. flon) circulating through the hose leaks through its wall, so that the amount of the refrigerant in the circuit is progressively reduced. In other words, the refrigerating or cooling capability of the system employing the rubber hose is comparatively rapidly lowered in use. Accordingly, the system must be frequently charged with the refrigerant, to maintain the nominal rating or capacity of the cooling system. Recently, the destruction of the ozone layer of the earth atmosphere by flon causes an environmental problem. It is therefore desired that a refrigerant transporting hose exhibits improved resistance to refrigerant permeation therethrough. While the conventional refrigerant transporting hose exhibits excellent flexibility and resistance to harmful metallic substances, it is not satisfactory in terms of the resistance to the permeation of the refrigerant.

In an attempt to improve the resistance of the conventional rubber hose to the refrigerant permeation, it is proposed to use a resinous material such as polyamide resins for one layer of the inner tube of the hose, as disclosed in laid-open Publication Nos. 60-113885, 63-125885 and 63-152787 of unexamined Japanese Patent Applications, and laid-open Publication No. 61-200976 of Japanese Utility Model Application, for example.

Such polyamide resins have higher rigidity (higher modulus of elasticity) than rubber materials, and a hose whose inner tube includes a polyamide resin layer suffers from reduced flexibility as a whole. When that polyamide resin layer is formed with a thickness as small as possible to avoid considerable reduction in the flexibility of the hose, the resistance to the refrigerant permeation becomes insufficient. Thus, it is extremely difficult to obtain a refrigerant hose which exhibits satisfactory properties in terms of both flexibility and resistance to the refrigerant permeation.

When a resinous layer of the inner tube of the hose is formed of a polyamide resin such as nylon 6 or nylon 66, or copolymer of nylon 6 and nylon 66, the hose has improved resistance to the refrigerant permeation, but suffers from lower flexibility and resistance to harmful metallic substances than the conventional rubber hose. As the polyamide resin as indicated above is excellent in the resistance to refrigerant permeation, it is possible to reduce the thickness of the resinous layer for improving the flexibility of the layer to some extent while maintaining the required permeation resistance. Even in this case, however, the flexibility of the hose is not satisfactory as compared with the conventional rubber hose.

Furthermore, in the case where other polyamides such as nylon 11 and nylon 12 are used for forming a layer of the inner tube of a hose, the hose has a high degree of resistance to harmful metallic substances, but tends to have lower resistance to the refrigerant permeation than the hose having a layer formed of the above-indicated polyamide such as nylon 6 or nylon 66. Consequently, the thickness of the layer formed of nylon 11 or nylon 12 must be increased so as to provide the same degree of refrigerant permeation resistance. The resinous layer having the increased thickness accordingly reduces the flexibility of the hose, and disables the hose to be practically used.

As described above, none of the conventional refrigerant transporting hoses are practically satisfactory in quality, in particular, in view of the recent increasing demand for further improvement in the resistance to refrigerant permeation therethrough.

SUMMARY OF THE INVENTION

It is therefore an object of the present invention to provide a refrigerant transporting hose which exhibits improved resistance to permeation of a refrigerant therethrough, while assuring satisfactory flexibility.

The above object has been achieved according to the principle of the present invention, which provides a refrigerant transporting hose comprising an innermost layer formed of a polyamide resin, at least one intermediate layer positioned radially outwardly of the innermost layer and formed of a rubber material, a reinforcing fiber layer positioned radially outwardly of the at least one intermediate layer, an outer tube positioned radially outwardly of the fiber layer and having at least one layer including an outermost layer, and at least one phenolic resin layer formed of a phenolic resin and having a total thickness within a range of 5-100μm. Each phenolic resin layer is provided at a corresponding one of interfaces between adjacent layers which are selected from the innermost layer, the at least one intermediate layer, the reinforcing fiber layer and the at least one layer of the outer tube.

The present invention was developed based on a finding that a phenolic resin is highly resistant to permeation of a refrigerant therethrough. Since the permeation resistance of the phenolic resin is as high as or higher than that of a polyamide resin, the phenolic resin layer or layers provided according to the present invention may effectively function as a gas-tight barrier, thereby cooperating with the polyamide innermost layer to assure a sufficient degree of permeation resistance. Further, the relatively small total thickness of the phenolic resin layer or layers effectively prevents a significant decrease in the overall flexibility of the hose. Thus, the present hose exhibits excellent permeation resistance property while satisfying the flexibility requirement.

For the reasons explained above, the present refrigerant transporting hose incorporating at least one phenolic resin layer effectively minimizes the frequency of charging with a refrigerant (flon) due to permeation of the refrigerant through the wall, and provides a solution to the environmental problem caused by the leakage of flon used as the refrigerant. Furthermore, the sufficiently high flexibility of the hose permits easy handling or piping operation of the hose, and high durability of the hose in use.

BRIEF DESCRIPTION OF THE DRAWINGS

The above and optional objects, features and advantages of the present invention will be better understood by reading the following detailed description of the present invention, in conjunction with the accompanying drawings in which the single FIGURE is a perspective view of a typical embodiment of a refrigerant transporting hose of the present invention.

DETAILED DESCRIPTION OF THE INVENTION

Referring to the drawing, reference numeral 1 denotes an innermost layer of the refrigerant transporting hose, that is, an inner layer of an inner tube of the hose. The innermost layer 1 is formed of a polyamide resin (or a blend or mixture thereof with other material or materials). The polyamide resin is selected from among known nylon materials such as nylon 11, nylon 12, nylon 612, nylon 6/66 and nylon 6/66/610, and may be a blend which consists of such nylon as a major component and other material(s). The innermost layer 1 of the polyamide resin has a thickness which is suitably determined in relation to the thickness of a phenolic resin layer which will be described. Generally, the thickness of the innermost layer 1 is selected within a range between 50μm and 500μm. When the thickness is less than 50μm, the resistance to permeation of a refrigerant through the polyamide resin layer 1 is insufficient, and the film strength of the layer is lowered, whereby the hose cannot be practically durable. When the thickness is larger than 500μm, the innermost layer 1 provides a sufficient resistance to the refrigerant permeation but suffers from excessively high rigidity.

Radially outwardly of the polyamide resin innermost layer 1, there is formed an intermediate rubber layer in the form of an outer layer 2 of the inner tube. On the outer layer 2, there is formed a reinforcing fiber layer 4, which is covered by an outer tube 3 having a suitable thickness, which is an outermost layer of the present refrigerant transporting hose. The outer layer 2 of the inner tube has relatively high elasticity and elastically supports the inner layers such as the innermost layer 1. Namely, the outer layer 2 is formed of a rubber material which exhibits excellent flexibility and thereby contributes to improving the flexibility of the hose as a whole. The outer layer 2 of the ordinary rubber composition also contributes to reduced cost of manufacture of the hose.

The outer layer 2 covered by the outer reinforcing fiber layer 4 consists of a single rubber layer or a plurality of rubber layers, which may be formed of a rubber material such as ethylene propylene diene rubber (EPDM), chlorinated isobutylene-isoprene rubber (Cl-IIR), chlorinated polyethylene (CPE), or epichlorohydrin rubber (CHC, CHR), as well as a rubber material usually used for an inner layer of a rubber hose, such as acrylonitrile-butadiene rubber (NBR) or chlorosulphonated polyethylene (CSM).

The reinforcing fiber layer 4 may be a fiber layer as commonly used as a reinforcing layer of ordinary rubber hoses. For example, the fiber layer 4 is formed by braiding, spiralling or knitting of yarn principally consisting of synthetic fiber such as polyester fiber or aramid fiber.

The outer tube 3, which serves as the outermost layer of the hose, has high weather-proof property, high heat resistance, and high water-permeation resistance, and other excellent properties required for the hose. In this respect, the outer tube 3 is preferably formed of EPDM, Cl-IIR or similar rubber material. However, other rubber materials may be used for the outer tube 3. While the outer tube 3 consists of a single layer in the present embodiment, the outer tube may consist of two or more rubber layers as needed.

According to the principle of the present invention, the refrigerant transporting hose is provided with at least one phenolic resin layer 5, each of which has a suitable thickness and is interposed between two adjacent layers of the layers described above, i.e., innermost layer 1 (inner layer of the inner tube 1, 2) formed of a polyamide resin, at least one intermediate rubber layer 2 (outer layer of the inner tube 1, 2), reinforcing fiber layer 4, and at least one layer of the outer tube 3, which are provided in the order of description in the radially outward direction of the hose. In the present embodiment, a phenolic resin layer 5 is formed between the polyamide resin innermost layer 1 and the intermediate rubber layer 2. However, the phenolic resin layer 5 may be formed between the outer layer 2 and the reinforcing fiber layer 4, and/or between the outer tube 3 and the fiber layer 4, and/or between the adjacent layers of the inner layer 2 or outer tube 3. Thus, one or more phenolic resin layers may be provided at a desired radial position or positions of the hose.

The phenolic resin layer 5 may consist of a product obtained by condensation polymerization of a least one phenol (such as phenol, cresol, xylenol and resorcinol) and at least one aldehyde (such as formaldehyde, acetaldehyde and furfural), in the presence of an acid or alkali catalyst. Generally, the layer 5 is prepared by forming a uniform-thickness film from a preliminary or initial condensation polymerization product in the liquid phase, and curing the prepared film. A suitable known elastomer such as NBR, CR, NR or SBR may be added to the condensation polymerization product or phenolic resin, for giving the phenolic resin layer 5 a desired degree of flexibility or elasticity. The phenolic resin layer 5 may be advantageously formed by using a commercially available phenolic adhesive agent. In this case, the interposed phenolic resin layer 5 effectively increases the integrally bonding strength between the two layers (between the inner and outer layers 1, 2 of the inner tube, in the illustrated example) in which the layer 5 is interposed.

While at least one phenolic resin layer 5 is provided, each interposed at the interface of the adjacent two layers 1, 2, 3 and 4 of the hose, the total thickness of the phenolic resin layer or layers 5 is preferably selected within a range of 5–100μm, and more preferably within a range of 10–60μm. It is desirable that each layer 5 have a uniform thickness over the entire area. When the thickness of one phenolic resin layer 5 is smaller than 5μm, it is difficult for the layer 5 to cooperate with the polyamide resin innermost layer 1 for providing a sufficient degree of resistance to the refrigerant permeation. When the thickness exceeds 100μm, on the other hand, the resistance to the refrigerant permeation is sufficiently improved, but the flexibility of the hose as a whole is deteriorated because of the inherently high rigidity of the phenolic resin. In the case where the two or more phenolic resin layers 5 are provided, the total thickness is desirably 100μm or smaller.

The structures and the thicknesses of the inner layer 2 of the inner tube, outer tube 3 (outmost layer) and the other layers of the hose are determined as desired, depending upon the materials used and the diameter and total wall thickness of the hose. For example, the thickness of the outer layer 2 of the inner tube is practically selected within a range of about 1–5 mm. When the thickness of the layer 2 is smaller than the lower limit of the above range, the hose may be easily flexed or curved, but is likely to be undesirably easily bent or kinked. When the thickness of the layer 2 is excessively large, the hose is relatively resistant to sharp bending or kink, but is harder than required. The outer tube 3 generally has a thickness within a range of about 1–3.5 mm, the lower limit being determined in view of the required resistance of the hose to permeation of water.

The refrigerant transporting hose constructed as described above may be fabricated, by sequentially forming the constituent layers in a process comprising the following steps, for example:

(a) Initially, the inner layer 1 of the inner tube (i.e., innermost layer of the hose) is formed by extrusion of a selected polyamide resin on a rubber or resin mandrel. Then, the innermost layer 1 formed in a tubular form on the mandrel is passed through a hole formed through a spongy structure which is impregnated with a liquid of a phenolic resin as described above with respect to the phenolic resin layer 5. As a result, the phenolic resin layer 5 is formed by a uniform coating of the phenolic resin liquid applied to the outer circumferential surface of the innermost layer 1. Subsequently, the outer layer 2 of the inner tube is formed by extrusion of a selected rubber composition on the phenolic resin layer 5. Thus, the three-layer inner tube 1, 5, 2 may be formed, as shown in the figure. Where the phenolic resin layer 5 is not interposed between the inner and outer layers 1, 2 of the inner tube, the layers 1, 2 are formed in sequential extrusion steps or in a single extrusion step.

(b) Then, the outer surface of the thus prepared inner tube 1, 2, 5 (1, 2) is coated with a suitable adhesive, if needed. The reinforcing fiber layer 4 is formed on the inner tube 1, 2, 5, by braiding, spiralling or knitting a reinforcing fiber yarn.

(c) After a suitable adhesive (e.g., rubber cement) is applied to the outer surface of the reinforcing fiber layer 4, a selected rubber composition is extruded to form the outer tube 3 having a suitable thickness.

(d) Then, the thus prepared unvulcanized laminar tubular mass is vulcanized into an integral tubular body wherein the constituent layers are bonded together. Subsequently, the mandrel is separated from the tubular body. In this manner, the refrigerant transporting hose is prepared as the end product. The vulcanization step is usually effected at a temperature of about 140°–170° C., for a period of about 30–90 minutes.

The refrigerant transporting hose manufactured in the process as described above by way of example provides a sufficiently high resistance to refrigerant permeation, while maintaining a required degree of flexibility, owing to the provision of the 5–100μm thick phenolic resin in the form of at least one interposed layer 5 in cooperation with the polyamide resin innermost layer 1. Each phenolic resin layer 5 is disposed at a corresponding one of interfaces between adjacent layers which are selected from the innermost layer 1, at least one intermediate layer 2, reinforcing fiber layer 4, and at least one layer of the outer tube 3 which includes the outermost layer of the hose. The present refrigerant transporting hose satisfies the recent stringent requirements imposed on hoses used for a cooling or air-conditioning system.

EXAMPLES

There will be described some examples of the refrigerant transporting hose of the present invention, to further illustrate the principle of the invention. However, it is to be understood that the present invention is by no means limited to the particular details of the examples.

In the following description, parts, ratio and percentage are given on a weight basis, unless otherwise specified.

Eight examples (Nos. 8–15) of a multi-layered structure as shown in the figure were produced according to the present invention while seven comparative examples (Nos. 1–7) were produced for comparison. The materials used for the constituent layers of the examples of the invention are indicated in Table 1-1, while the corresponding materials of the comparative examples are indicated in Table 1-2. It is noted that the positions of the phenolic resin layer 5 in Examples 9 and 10 are different from that shown in the figure. In the tables, the constituent layers of the hoses are named as the first, second and third layers of the inner tube, reinforcing fiber layer 4, and the first and second layers of the outer tube 3, which are disposed in the order of description in the radially outward direction of the hose. For example, the second layer of the inner tube is the phenolic resin layer 5 in Example 8, and the third layer of the inner tube is the phenolic resin layer 5 in Example 9. In Example 10, the phenolic resin layer 5 is the first layer of the outer tube 3. The manufacture of each example was conducted in the process described above, by extruding the constituent layers one on another from inside toward outside of the hose, and thermally vulcanizing the obtained multi-layered tubular mass, thereby producing the hose having an inside diameter of 11.5 mm and an outside diameter of 21.5 mm. The phenolic resin layer 5 was formed by applying a commercially available phenolic resin adhesive to the appropriate inner layer.

The rubber materials indicated as NBR, EPDM, Cl-IIR and CPE in Tables 1-1 and 1-2 have the following compositions:

| Composition | Parts |
|---|---|
| (1) NBR | |
| NBR (AN = 41%) | 100 |
| FEF carbon black | 70 |
| dioctyl phthalate | 10 |
| ZnO | 5 |
| stearic acid | 1 |
| sulfur | 1 |
| tetraethyl thiuram disulfide | 1.5 |
| N-cyclohexyl-2-benzothiazyl sulfenamide | 1.5 |
| (2) EPDM | |
| EPDM polymer | 100 |
| FEF carbon black | 70 |
| paraffinic process oil | 15 |
| ZnO | 5 |
| stearic acid | 1 |
| sulfur | 1 |
| tetraethyl thiuram disulfide | 1.5 |
| N-cyclohexyl-2-benzothiazyl sulfenamide | 1.5 |
| zinc.di-n-butyl dithiocarbamate | 1.5 |
| (3) Cl-IIR | |
| Cl-IIR (Cl = 1.2%) | 100 |
| FEF carbon black | 70 |
| paraffinic process oil | 10 |
| ZnO | 5 |
| stearic acid | 1 |
| tetramethyl thiuram disulfide | 1 |
| dibenzothiazyl disulfide | 1 |
| (4) CPE | |
| CPE (Cl = 35%) | 100 |
| FEF carbon black | 40 |
| dioctyl phthalate | 10 |
| MgO | 10 |
| triallylisocyanurate | 3 |
| di-cumylperoxide | 5 |

TABLE 1-1

| | | COMPARATIVE EXAMPLES | | | | | | |
|---|---|---|---|---|---|---|---|---|
| EXAMPLE NO. | | 1 | 2 | 3 | 4 | 5 | 6 | 7 |
| INNER TUBE | | | | | | | | |
| 1ST LAYER | MATERIAL | NBR | NYLON 12 | NYLON 612 | NYLON 6 | NYLON 6 | NYLON 612 | NYLON 612 |
| | THICKNESS (mm) | 3.0 | 0.3 | 0.5 | 0.1 | 0.1 | 0.07 | 0.07 |
| 2ND LAYER | MATERIAL | — | | | NBR | NBR | PHENOL RESIN | PHENOL RESIN |
| | THICKNESS (mm) | — | 2.9 | 2.5 | 2.9 | 2.9 | 0.001 | 0.15 |
| 3RD LAYER | MATERIAL | — | — | — | — | — | NBR | NBR |
| | THICKNESS (mm) | — | — | — | — | — | 2.9 | 2.78 |
| FIBER LAYER | | POLYESTER FIBER: 3, THICKNESS: 0.5 mm | | | | | | |
| OUTER TUBE | | | | | | | | |
| 1ST LAYER | MATERIAL | EPDM | | | | | | |
| | THICKNESS (mm) | 1.5 | | | | | | |
| 2ND LAYER | MATERIAL | — | — | — | — | — | — | — |
| | THICKNESS (mm) | — | — | — | — | — | — | — |

TABLE 1-2

| | | PRESENT INVENTION | | | | | | | |
|---|---|---|---|---|---|---|---|---|---|
| EXAMPLE NO. | | 8 | 9 | 10 | 11 | 12 | 13 | 14 | 15 |
| INNER TUBE | | | | | | | | | |
| 1ST LAYER | MATERIAL | NYLON 612 | | | NYLON 12 | | | | |
| | THICKNESS (mm) | 0.07 | | | 0.3 | | | | |
| 2ND LAYER | MATERIAL | PHENOL RESIN | NBR | | PHENOL RESIN | | | | |
| | THICKNESS (mm) | 0.03 | 2.9 | | 0.03 | | | | |
| 3RD LAYER | MATERIAL | NBR | PHENOL RESIN | — | NBR | Cl-IIR | EPDM | CPE | Cl-IIR |
| | THICKNESS (mm) | 2.9 | 0.03 | — | 2.87 | 2.87 | 2.87 | 2.87 | 2.87 |
| FIBER LAYER | | POLYESTER FIBER: 3, THICKNESS: 0.5 mm | | | | | | | |
| OUTER TUBE | | | | | | | | | |
| 1ST LAYER | MATERIAL | EPDM | | PHENOL RESIN | EPDM | | | | Cl-IIR |
| | THICKNESS (mm) | 1.5 | 1.5 | 0.03 | 1.5 | | | | 1.5 |
| 2ND LAYER | MATERIAL | — | — | EPDM | — | — | — | — | — |
| | THICKNESS (mm) | — | — | 1.5 | — | — | — | — | — |

The prepared hoses of Example Nos. 1–15 were tested for flexibility and resistance to refrigerant permeation. The test results are indicated in Table 2.

The tests were conducted in the following manner:

Flexibility Test

The hoses were cut to obtain 500-mm long test specimens. The specimen hoses were wound on a mandrel having a radius of 100 mm, and loads (kgf) exerted to the ends of the hoses were measured. The flexibility of the hoses increases with a decrease in the measured kgf value.

Permeation Resistance

The 500-mm long specimen hoses were charged with a 40 g of flon 12 (R12), with the open ends fluid-tightly plugged, and left for 72 hours. The overall weight of each charged specimen hose after 72 hours was measured and compared with the initial weight, to calculate the amount (g) of the flon which has permeated through the wall of the hose. The permeation resistance increases with a decrease in the calculated permeation amount.

The test results show that the multi-layered hoses of Example Nos. 8–15 which include the interposed phenolic resin layer 5 according to the present invention exhibited excellent properties in both of the flexibility and permeation resistance.

More specifically, the hoses prepared according to the principle of the present invention exhibited considerably higher degrees of permeation resistance, than the conventional hose as exemplified by Example No. 1 whose inner tube is made solely of rubber materials. The hoses of comparative Example Nos. 2-5 whose innermost layer (inner layer of the inner tube) is made of a polyamide resin suffered from insufficiency of either the flexibility or the permeation resistance. Further, the hose of comparative Example No. 6 whose phenolic resin layer has a thickness smaller than 5μm failed to improve the permeation resistance to a satisfactory extent, while the hose of comparative Example No. 7 whose phenolic resin layer has a thickness larger than 100μm suffered from deterioration of the flexibility. To the contrary, the multi-layered hoses of Example Nos. 8-15 whose phenolic resin layer has a thickness within the specified range of 5-100μm according to the present invention were satisfactory in both the flexibility and the resistance to permeation of the refrigerant.

While the present invention has been described in detail with a certain degree of particularity, it is to be understood that the invention is not limited to the details of the illustrated embodiments or examples, but may be embodied with various changes, improvements and modifications, which may occur to those skilled in the art, without departing from the spirit and scope of the invention defined in the appended claims.

TABLE 2

| EXAMPLE NO. | PERMEATION RESISTANCE (g/m/72 hr) | FLEXIBILITY (kgf) |
| --- | --- | --- |
| 1 | 25 | 1.0 |
| 2 | 15 | 1.3 |
| 3 | 9 | Kink |
| 4 | 10 | 1.5 |
| 5 | 2 | 1.8 |
| 6 | 10 | 1.3 |
| 7 | 2 | 2.2 |
| 8 | 6 | 1.5 |
| 9 | 6 | 1.5 |
| 10 | 7 | 1.6 |
| 11 | 7 | 1.5 |
| 12 | 6 | 1.4 |
| 13 | 7 | 1.5 |
| 14 | 6 | 1.5 |
| 15 | 6 | 1.4 |

We claim:

1. A refrigerant transporting hose comprising:
   an innermost layer having a thickness of 50-500μm and formed of a polyamide resin selected from the group consisting of nylon 11, nylon 12, nylon 612, nylon 6/66, nylon 6/66/610, and a blend which comprises as a major component at least one of said nylon 11, said nylon 12, said nylon 612, said nylon 6/66 and said nylon 6/66/610;
   at least one intermediate layer positioned radially outwardly of said innermost layer and formed of a rubber material;
   a reinforcing fiber layer positioned radially outwardly of said at least one intermediate layer;
   an outer tube positioned radially outwardly of the reinforcing fiber layer and having at least one layer including an outermost layer; and
   at least one phenolic resin layer formed of a phenolic resin and having a total thickness within a range of 5-100μm, each of said at last one phenolic resin layer being provided at a corresponding one of interfaces between adjacent layers which are selected from said innermost layer, said at least one intermediate layer, said reinforcing fiber layer and said at least one layer of said outer tube.

2. A refrigerant transporting hose according to claim 1, wherein said total thickness of said at least one phenolic resin layer is within a range of 10-60μm.

3. A refrigerant transporting hose according to claim 1, wherein said at least one phenolic resin layer consists of a single phenolic resin layer.

4. A refrigerant transporting hose according to claim 3, wherein said single phenolic resin layer is interposed between said innermost layer and said at least one intermediate layer.

5. A refrigerant transporting hose according to claim 3, wherein said single phenolic resin layer is interposed between said at least one intermediate layer and said reinforcing fiber layer.

6. A refrigerant transporting hose according to claim 3, wherein said single phenolic resin layer is interposed between said reinforcing fiber layer and said outermost layer.

7. A refrigerant transporting hose according to claim 1, wherein said phenolic resin consists essentially of a condensation polymerization product of at least one phenol and at least one aldehyde.

8. A refrigerant transporting hose according to claim 7, wherein said at least one phenol comprises phenol, xylenol or resorcinol.

9. A refrigerant transporting hose according to claim 7, wherein said at least one aldehyde comprises formaldehyde, acetaldehyde or furfural.

10. A refrigerant transporting hose according to claim 1, wherein said phenolic resin consists of a phenolic resin adhesive.

11. A refrigerant transporting hose according to claim 1, wherein said at least one phenolic resin layer is formed on said innermost layer, by passing said innermost layer through a hole formed through a spongy structure which is impregnated with a liquid of said phenolic resin.

* * * * *